US012736375B2

(12) United States Patent
Zhan et al.

(10) Patent No.: US 12,736,375 B2
(45) Date of Patent: Sep. 15, 2026

(54) OPTICAL FIBER-BASED TSUNAMI WARNING SYSTEM USING SUBMARINE TELECOMMUNICATION CABLES

(71) Applicant: California Institute of Technology, Pasadena, CA (US)

(72) Inventors: Zhongwen Zhan, Arcadia, CA (US); Valey Kamalov, Gainesville, FL (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 18/883,153

(22) Filed: Sep. 12, 2024

(65) Prior Publication Data

US 2025/0087075 A1 Mar. 13, 2025

Related U.S. Application Data

(60) Provisional application No. 63/537,886, filed on Sep. 12, 2023.

(51) Int. Cl.

| | |
|---|---|
| ***G01D 5/353*** | (2006.01) |
| ***G08B 13/186*** | (2006.01) |
| ***G08B 21/10*** | (2006.01) |
| *G01L 11/02* | (2006.01) |
| *H04B 10/29* | (2013.01) |

(52) U.S. Cl.
CPC ......... *G01D 5/353* (2013.01); *G01D 5/35383* (2013.01); *G08B 13/186* (2013.01); *G08B 21/10* (2013.01); *G01D 5/35358* (2013.01); *G01L 11/025* (2013.01); *H04B 10/29* (2013.01)

(58) Field of Classification Search
CPC ....... G08B 13/186; G08B 21/10; G01L 11/02; G01L 11/025; G01N 21/00; G01D 5/35383; G01D 5/35358; G01H 9/00; G01V 1/00; G01V 1/008; G01V 1/28; G01V 1/30; H04B 10/29
See application file for complete search history.

(56) References Cited

U.S. PATENT DOCUMENTS

| | | | | |
|---|---|---|---|---|
| 7,271,884 | B2 * | 9/2007 | Payton | G01D 5/35383 356/73.1 |
| 2017/0115138 | A1 * | 4/2017 | Sternklar | G01D 5/36 |
| 2018/0113037 | A1 | 4/2018 | Molteni et al. | |
| 2020/0028727 | A1 | 1/2020 | Chen | |
| 2021/0018817 | A1 | 1/2021 | Kowalevicz et al. | |
| 2021/0255344 | A1 * | 8/2021 | Kamalov | G01V 1/282 |
| 2022/0103264 | A1 | 3/2022 | Babakhani et al. | |
| 2022/0214167 | A1 | 7/2022 | Melin | |
| 2023/0060104 | A1 | 2/2023 | Masuda | |

(Continued)

OTHER PUBLICATIONS

Bogris et. al., :Sensitive seismic sensors based on microwave frequency fiber interferometry in commercially deployed cables. Scientific Reports vol. 12, Article No. 14000 (2022).

(Continued)

*Primary Examiner* — Van T Trieu
(74) *Attorney, Agent, or Firm* — Gates & Cooper LLP

(57) ABSTRACT

The invention describes a tsunami warning system utilizing properties of light in optical fibers within submarine telecommunication cables. Enhanced by microwave frequency modulation and High-Loss Loop Back (HLLB) techniques, this system measures photoelastic changes for more stable, long-period tsunami wave detection.

18 Claims, 15 Drawing Sheets

(56) References Cited

U.S. PATENT DOCUMENTS

| | | | |
|---|---|---|---|
| 2023/0073833 | A1 | 3/2023 | Yano et al. |
| 2023/0120850 | A1 | 4/2023 | Goncharuk et al. |

OTHER PUBLICATIONS

Fortier et al., "20 years of developments in optical frequency comb technology and applications". Communications Physics vol. 2, Article No. 153 (2019).

Li et al., "Coherently parallel fiber-optic distributed acoustic sensing using dual Kerr soliton microcombs". Science Advances, 2024, https://www.science.org/doi/10.1126/sciadv.adf8666.

Mazur et al., "Real-Time In-Line Coherent Distributed Sensing over a Legacy Submarine Cable". https://opg.optica.org/abstract.cfm?URI=OFC-2024-Th4B.8., Optical Fiber Communication Conference (OFC) 2024, 2024.

PCT International Search Report and Written Opinion dated Dec. 16, 2024 for PCT Application No. PCT/US24/46354.

* cited by examiner

Rx
Tx
310
302
EDFA
EDFA
Repeater i+1
206
Span
304
303
206b

λ
302a
302b
302
206a
EDFA
EDFA
Repeater
i
Tx
Rx

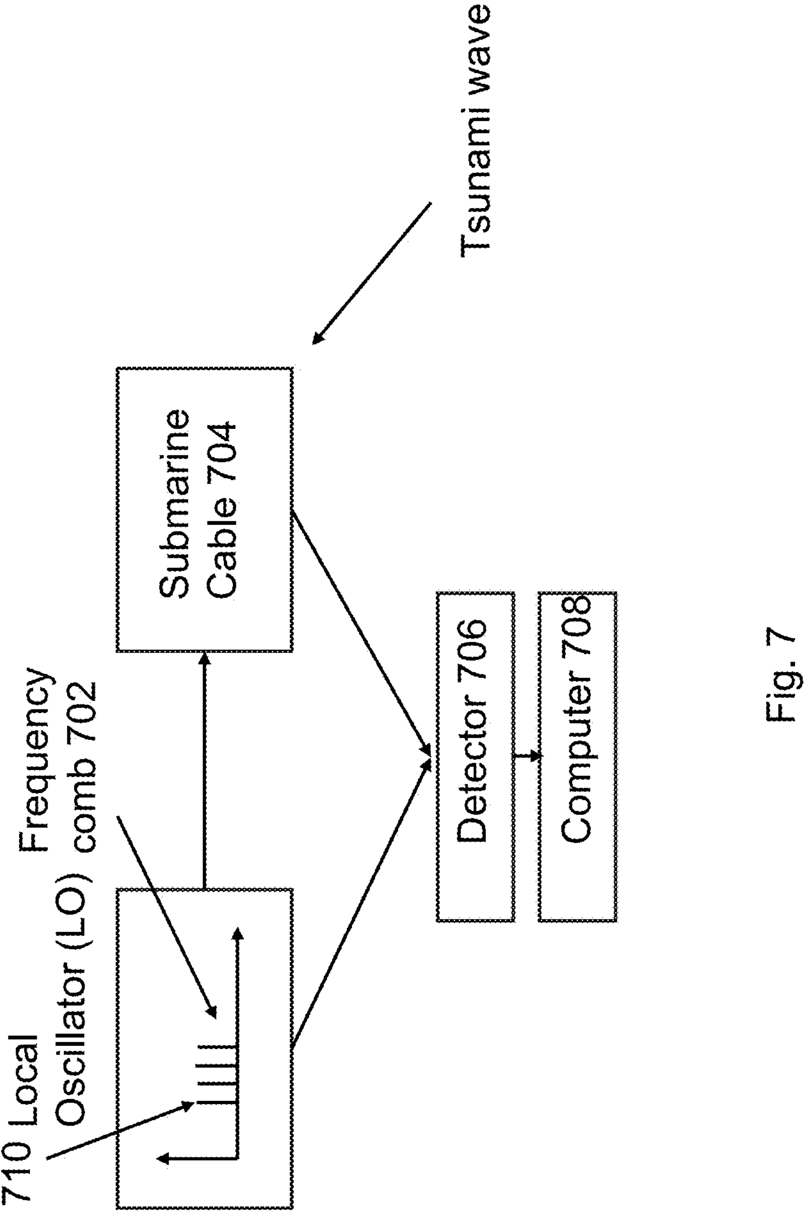
Fig. 7
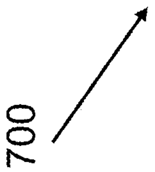

310
Rx
Tx
302
Repeater i+1
EDFA
EDFA
Rayleigh backscattering
in span i
is coupled into reverse
direction
206
303
Span
304
206b 302a
302
206a
Repeater i
EDFA
EDFA
LO sourceTx
Coherent Rx

OPTICAL FIBER-BASED TSUNAMI WARNING SYSTEM USING SUBMARINE TELECOMMUNICATION CABLES

CROSS-REFERENCE TO RELATED APPLICATIONS

This application claims the benefit under 35 U.S.C. Section 119(e) of the following and commonly-assigned U.S. Provisional Patent Application Ser. No. 63/537,886 filed Sep. 12, 2023 entitled "OPTICAL FIBER-BASED TSUNAMI WARNING SYSTEM USING SUBMARINE TELECOMMUNICATION CABLES" (CIT 9067) by Valey Kamalov and Zhongwen Zhan, which application is incorporated by reference herein.

BACKGROUND OF THE INVENTION

Field of the Invention

The invention relates to tsunami warning systems, incorporating submarine telecommunication cables, and methods of monitoring changes in the cables using e.g., but not limited to, microwave frequency modulation, frequency combs, Rayleigh backscattering, and High-Loss Loop Back techniques for enhanced sensing capabilities.

Related Art

Existing systems for tsunami detection, such as DART buoys, have limitations including limiting accuracy and lack of real time detection.

SUMMARY OF THE INVENTION

The present disclosure describes methods and systems for using existing submarine telecommunication infrastructure for more accurate and real-time detection of tsunamis.

In one embodiment, a system for detecting tsunamis comprises a submarine telecommunication cable with optical fibers; optical submarine repeaters with High-Loss Loop Back and microwave modulation; a sensing transmitter and receiver; and a 24/7 computer algorithm at a tsunami warning center for detecting tsunamis from signals propagating in the optical fiber using existing telecom infrastructure.

In another embodiment, a system for detecting tsunamis comprises a submarine telecommunication cable with optical fibers; optical submarine repeaters with feedback; an LO source transmitter for transmitting an optical frequency comb; a receiver for detecting Rayleigh scattering of the frequency comb; and a 24/7 (24 hours 7 days a week) computer algorithm at a tsunami warning center for detecting tsunamis from the Rayleigh backscattering.

BRIEF DESCRIPTION OF THE DRAWINGS

Referring now to the drawings in which like reference numbers represent corresponding parts throughout:

FIG. 7. Schematic of a system for detecting a tsunami according to a second embodiment.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Figure 1:
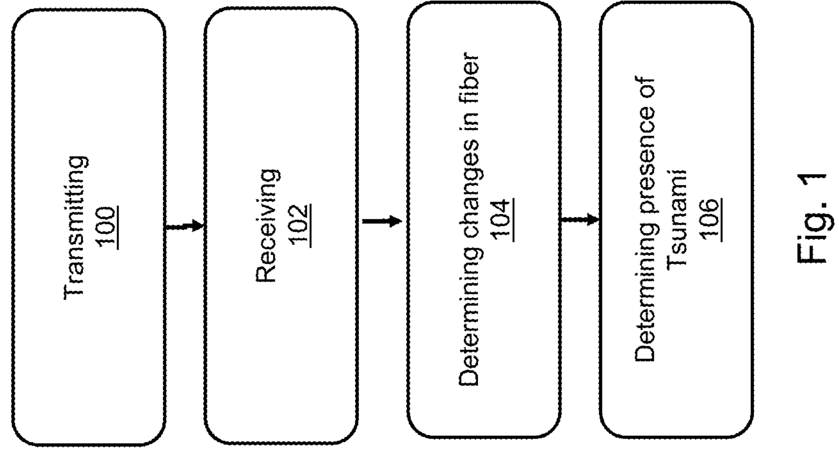
FIG. 1. Flowchart illustrating a method of detecting a tsunami.

FIG. 1 illustrates a method for detecting a tsunami, comprising the following steps.

Block 100 comprises transmitting electromagnetic signals through a plurality of locations along a submarine telecommunication cable comprising optical fibers.

Block 102 represents receiving the electromagnetic signals transmitted through the plurality of locations along the submarine telecommunication cable.

Block 104 represents determining, from a property of the optical signals at the different locations, changes in at least one property of the optical fibers spanning the different locations.

Block 106 represents associating threshold changes in the at least one property of the optical fibers with detection of a tsunami wave above the locations in the telecommunication cable.

In one embodiment, the method of detecting a tsunami comprises (1) applying Microwave Frequency Fiber Interferometer (MFFI) to the reflections from high loss loop feedback (HLLB) to sense and localize the changes in fiber length and photoelastic properties (e.g., susceptibility) in response to the tsunami wave changing ocean floor pressure, which alters the fiber's length and photoelastic properties. The computer algorithm can then be implemented to correlate data relating the changes in the fiber length and photoelastic properties to the presence or absence of a tsunami so that warnings can be initiated if needed.

In one embodiment, High-Loss Loop Back (HLLB) can be employed within optical repeaters to monitor amplifier performance. It returns a small fraction of the signal power, helping to localize pressure changes caused by tsunami waves.

In one embodiment, MFFI applies radiofrequency modulation to the sensing channel, allowing stable measurements in both MHz and GHz frequency ranges and providing the system with sensitivity to long-period tsunami waves.

Figure 2:
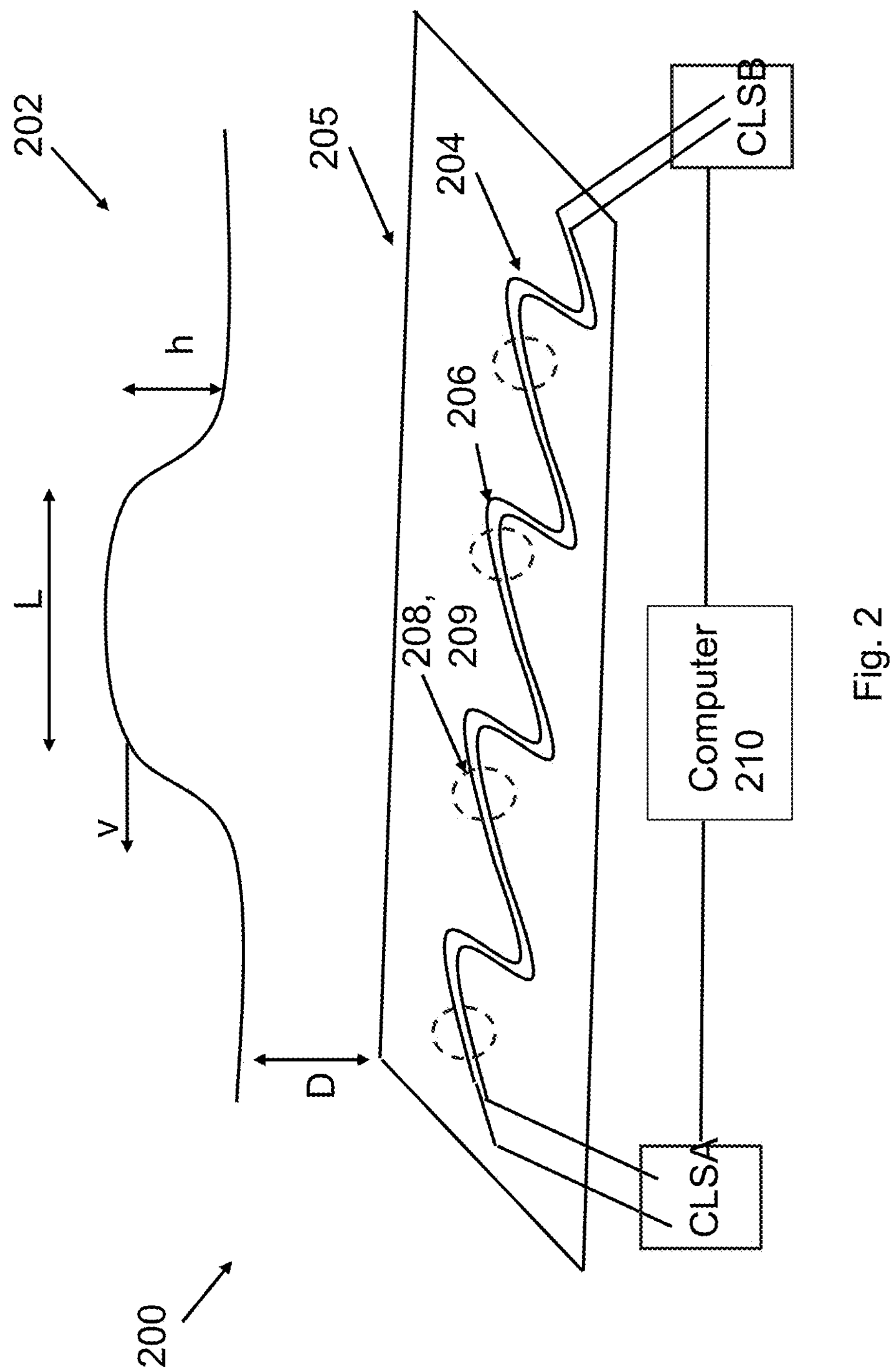
FIG. 2. Schematic of a system for detecting a tsunami according to a first embodiment.

First Embodiment System Components for Detection of Tsunamis Using Frequency Modulation FIG. 2 illustrates a system 200 for detecting a tsunami 202 and comprising the following components: a submarine cable 204 laid on the ocean floor 205 at a depth D from the surface of the ocean and containing optical fibers 206; optical repeaters 208 that enhance sensing capabilities, e.g., with high loss loop feedback; a sensing transmitter and receiver at each of cable landing station A (CLSA) and cable landing station B (CLSB) for incorporating (e.g., microwave) frequency modulation; and a computer 210 for implementing a computer algorithm which can run constantly at a tsunami warning center.

The Tsunami may have velocity $$v = \sqrt{gh},$$

where g is acceleration due to gravity and h is height or amplitude of the wave, typically approximately 1 meter and length L in a range of 100 km-1000 km.

Figure 3:
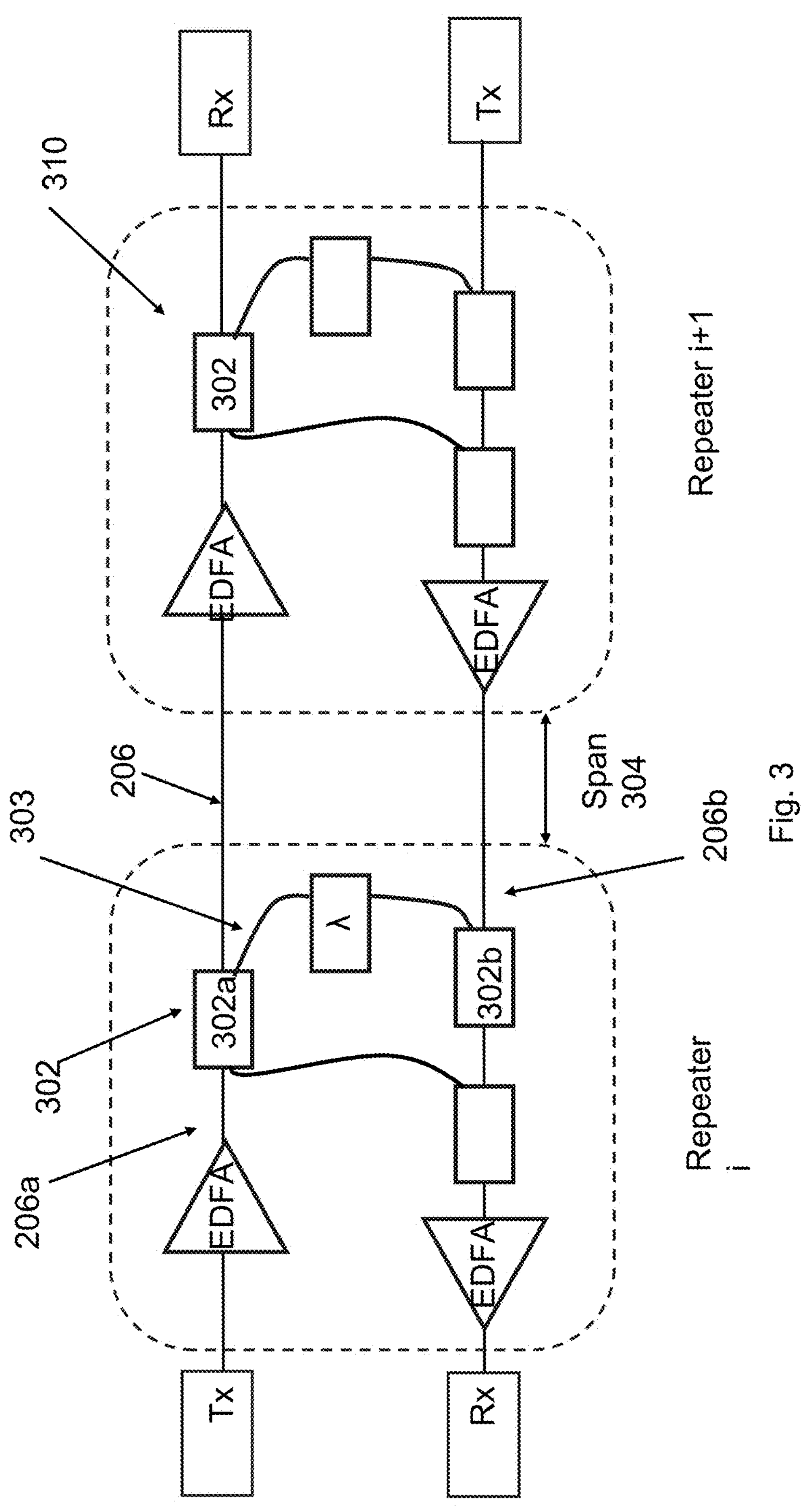
FIG. 3. Schematic of a repeater system for providing feedback between a transmitter and a receiver.

FIG. 3 illustrates example repeaters distributed along the length of the cable comprising one or more pairs (e.g., 4-24) of optical fibers 206, including erbium doped fiber amplifier (EFDA), couplers 202 for coupling signals between a transmitter Tx and a receiver Rx through the optical fiber 206; and wavelength filter λ for filtering frequencies of the electromagnetic signals fed back to the receiver.

Figure 4:
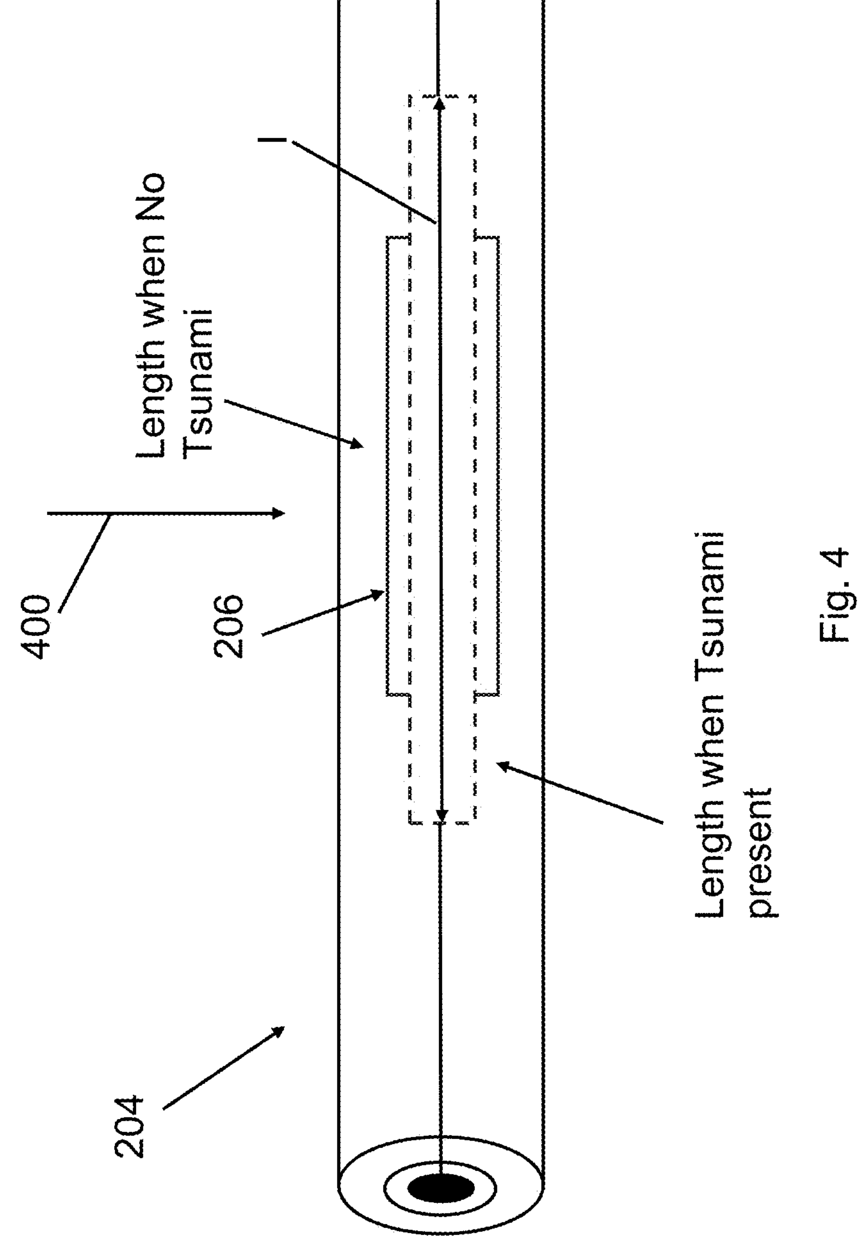
FIG. 4. Schematic of an submarine cable showing changes in optical fiber length in response to pressure from a tsunami.

FIG. 4 illustrates the telecommunication cable 204 comprising optical fiber 206, showing how the length l of the fiber can change in the presence of pressure 400 applied by a tsunami wave.

Figure 5:
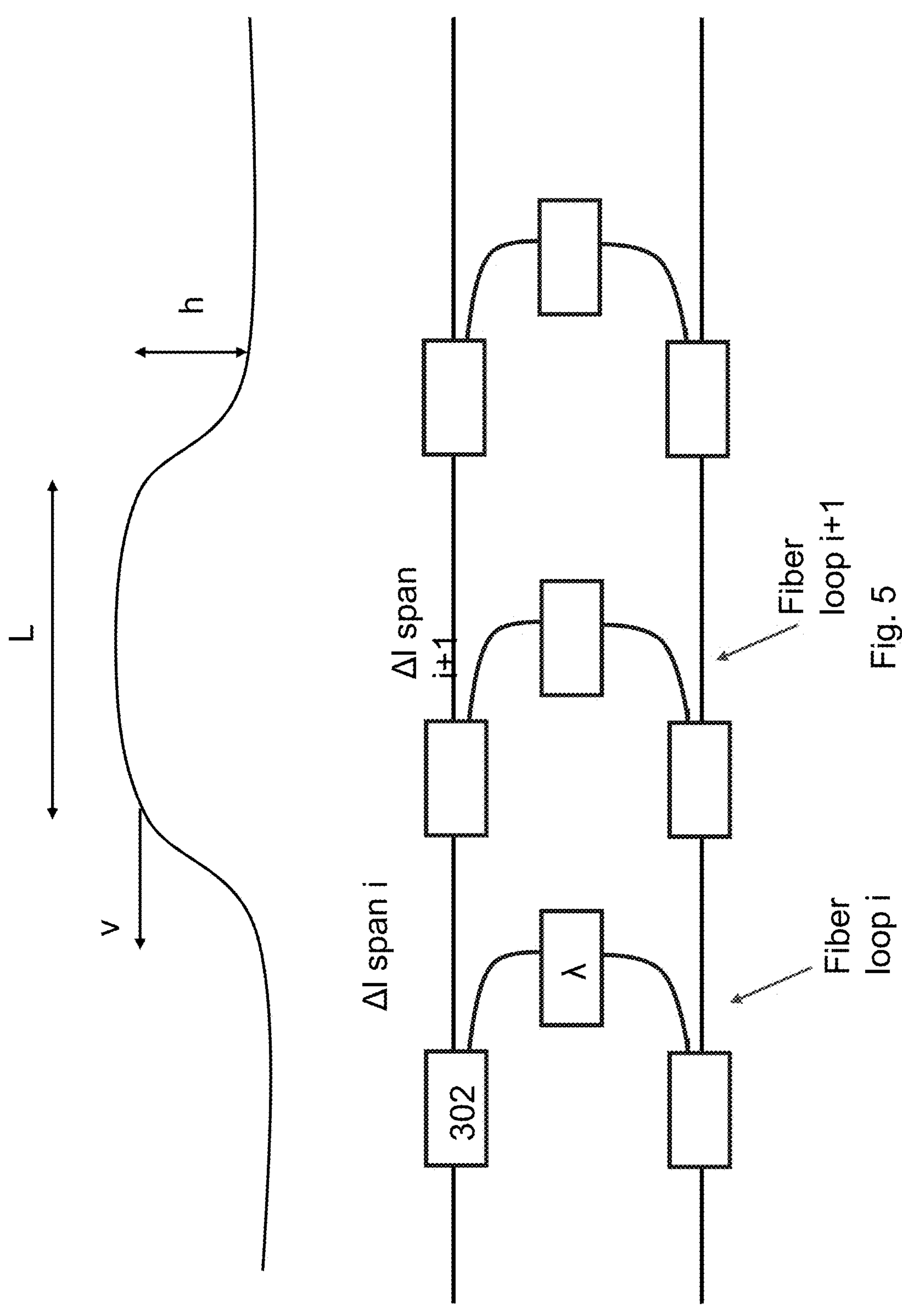
FIG. 5. Schematic showing fiber loops providing feedback.

FIG. 5 illustrates a plurality of feedback fiber loops separated by i spans, wherein the loops i+1 and i are separated by span distance proportional to a propagation time of the electromagnetic signals between the ith repeater and the i+1th repeater. Feedback from each of the loops can be used to measure a change in length $\Delta l_{spani}$ of each of the spans and in particular compare the length of the adjacent spans $\Delta l_{spani}$ and $\Delta l_{spani+1}$ in response to pressure applied by a tsunami wave.

Figure 6:
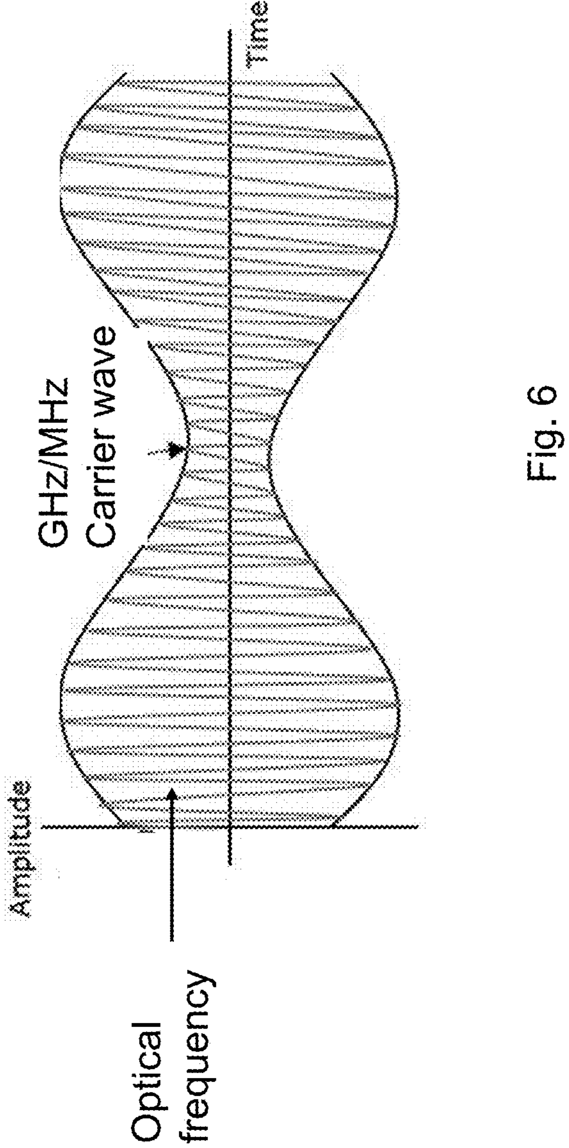
FIG. 6. Schematic of a modulated electromagnetic signal for measuring changes in the length of the fiber.

FIG. 6 illustrates an example electromagnetic signal transmitted through the fibers, comprising a carrier wave comprising gigahertz or megahertz frequencies of the form cos('Ωt+Φ) modulated by a higher (e.g., optical) frequency, e.g., of 200 THz. The transmitted electromagnetic radiation that is fed back from each of the loops is detected at the receiver, where the phase is extracted, so that a wave of the form cos('Ωt+k $L_{spani}$) is detected from the ith loop and the wave of the form cos('Ωt+k $L_{spani+1}$) is detected from the i+1th loop, where L is the length of each of the spans. A computer algorithm can be used to extract $\Delta l_{spani}$ and $\Delta l_{spani+1}$ from $L_{spani}$ and $L_{spani+1}$, respectively. The computer algorithm can generate an alarm when $\Delta l_{spani}$ or $\Delta l_{spani+1}$ are greater than a threshold associated with a presence of a tsunami (the threshold can be determined by calibration).

In some embodiments, the signal transmitted through the fibers can comprise pulses of electromagnetic radiation. In some embodiments, the spatial resolution of the tsunami detection is the span length between repeaters.

Second Embodiment System Components for Detection of Tsunamis Using Rayleigh Detection FIG. 7 illustrates a system 700 for tsunami wave detection comprising a LO source outputting and launching a highly stable microwave signal (e.g., frequency comb 702 e.g., as illustrated in FIG. 1 of [1]) for transmission through optical fibers in a submarine cable 704; and a detection system 706 (e.g, photodiode) mixing the transmitted output from the submarine cable with the frequency comb (LO signal) prior to input into the submarine cable. The (e.g., microwave) frequency of the comb 702 transmitted through the cable is affected by the passage of tsunami waves and a computer system 708 can compare the microwave frequency of the comb transmitted through the cable with local oscillator reference comb (LO signal) so as to detect low frequency oscillations (through Fourier transformation of the mixed signal) associated with the pressure generated by the Tsunami. Coherent detection based on homodyne detection with LO signal and Rayleigh backscattering signal originated in the submarine cable is one possible solution In another embodiment, with heterodyne detection, a pair of frequency combs (e.g., as illustrated in FIG. 1 in [4]) forms a dual-comb interferometer. One of the combs serves as the probing light, while the other one works as the local reference, enabling convenient heterodyne measurement without requiring optical spectrum analyzer or high-speed photodetector.

Tsunami wave detection using a dual frequency combs enables higher sensitivity due to the interferometric nature of the dual comb detection.

Using frequency combs as the signal source enables 100 . . . 1000 times higher signal/noise ratio (as compared to non-comb sources) since the frequency comb contains 100 . . . 1000 lines 710 (Reference [4] uses 10 lines comb to confirm that the response of each frequency channel can be linearly accumulated, demonstrating a 10-fold sensitivity enhancement compared to a single-frequency laser). The equidistant frequency lines 710 have the same phase and changes in their phase have an additive property, so that the i phases φ1, φ2 . . . , Φi . . . φN for each of the n spans of the cable can be added, resulting in higher signal to noise (S/N) ratio. Higher S/N enables real time tsunami monitoring by monitoring Rayleigh backscattering from multiple spans of submarine cable in real time.

In one embodiment, a frequency comb with center wavelength 1550 nm, free spectral range (FSR) of 50 GHz, bandwidth 1528-1565 nm and pulse length 5 microsecond enables 500 meter resolution.

Rayleigh backscattering in submarine optical fiber is coherent and does not change the phase of light. Thus detection of Rayleigh backscattered light originating from the frequency comb includes beating terms when the backscattered light is combined with the local oscillator and any changes in phase can be associated with pressure applied from a tsunami wave.

In one embodiment, a procedure for obtaining a phase with coherent detection of multiple components of the comb signal is as follows. Tsunami waves affects the phase of optical signal through a Poisson effect in the fiber, and information about the tsunami is extracted because the phase of the local oscillator is known.

Consider the Rayleigh backscattered signal of the form: $E_1 e^{i(\omega 1t+\varphi 1)} + \ldots + E_i e^{i(\omega it+\varphi i)}$ where $E_i$ is the electric field amplitude of the electromagnetic signal of different components of frequency comb.

When the Rayleigh backscattering is mixed with a local oscillator at the detector with constant phase φ0, $E_1 e^{i(\omega 1t+\varphi 0)} + \ldots + E_i e^{i(\omega it+\varphi 0)}$, the detector outputs a coherent detection signal current I in response to the mixed signal of the form: $I=c|\Sigma E|^2=|E_1 e^{i(\omega 1t+\varphi 0)} + \ldots + E_i e^{i(\omega it+\varphi 0)} \ldots + E_1 e^{i(\omega 1t+\varphi 1)} + \ldots + E_i e^{i(\omega it+\varphi i)}|^2$ where ωi is the frequency of the i-component of the comb signal. In the case of homodyne detection below, the phases φ2−φ0, and φ1−φ0 of the electromagnetic signal received from each component of the frequency comb can be obtained from the DC current (I) terms in response to the Rayleigh backscattering as follows (φ0 is the known local oscillator phase):

φ1−φ0 can be obtained from the term $E_1 E_1^* e^{i(\omega 1t+\varphi 1)-i(\omega 1t+\varphi 0)}$.

φ2−φ0 can be obtained from the term $E_2 E_2^* e^{i(\omega 2t+\varphi 2)-i(\omega 2t+\varphi 0)}$.

φ1 and φ2 of the Rayleigh backscattering at different spectral components of the frequency comb carry similar phase information because both propagate through the same media and refractive index changes are negligible between ω1 and ω2. Linear accumulation of phase from all components of frequency comb results in high signal to noise ratio.

Figure 8:
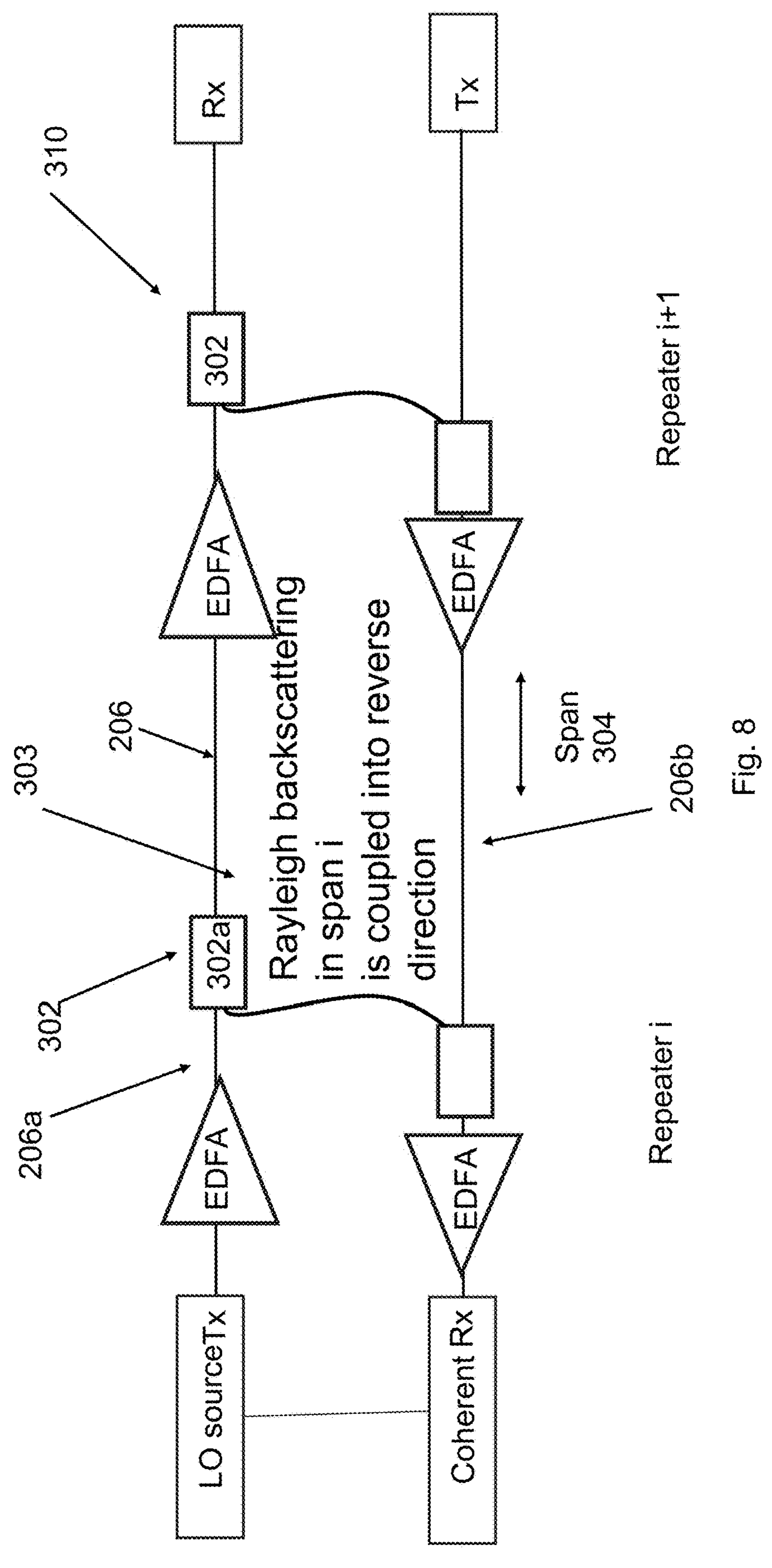
FIG. 8. Schematic of optical fiber loops in the submarine cable used for feedback of Rayleigh Scattering. Rayleigh backscattering in span I is coupled into reverse direction FIG. 9. Schematic of pulses containing a frequency comb transmitted through the fiber.
Figure 9:
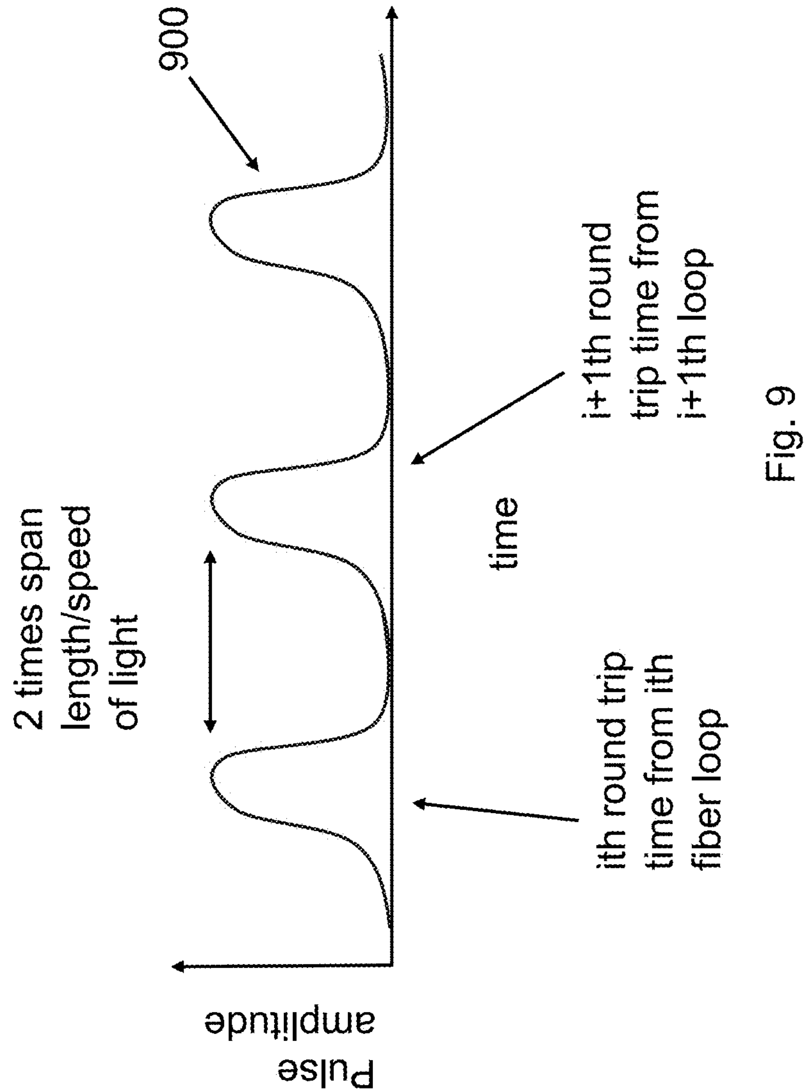

FIG. 8 illustrates a submarine cable system for transmitting and receiving a series of input pulses 900 (comprising one or more frequency combs) received from the local oscillator. FIG. 9 illustrates a series of the pulses and the detector 706 can measure Rayleigh scattering of each of the input pulses if the time separation of the pulses corresponds to the time taken for the pulse to travel twice the span length between adjacent repeaters (as illustrated in FIG. 8, temporal separation is 2*span length/speed of light). Couplers 302 and frequency filters λ in the optical fiber loops 804 at each of the i repeater stations can be used to feedback the Rayleigh scattering to the detector 706 which can be located at a cable landing station Since the cable position (and spatial positions of the repeaters are known, or coordinates of each span are known from cable deployment historic data), the coherent current signal I can be used to measure, detect, or identify phase changes in optical signal as a function of time at each of the spans, i.e., φ1(t, span 1), . . . φ1(t, span i). As noted above, phase changes for each spectral component of the comb carry the same information on environmental effects and serve purely for improvement of signal to noise ration Correlation of φ1(t, span 1), . . . φ1(t, span i), between different and multiple spans (along with knowledge of the span coordinates) is used to detect and monitor tsunami waves in the ocean. More specifically, phase changes in time for every span can indicate tsunami wave magnitude for every span. Since tsunami wavelengths have the same order of magnitude or larger than the span length (60-90 km), correlation between neighboring spans is critical to increase false detection of tsunami.

Figure 10:
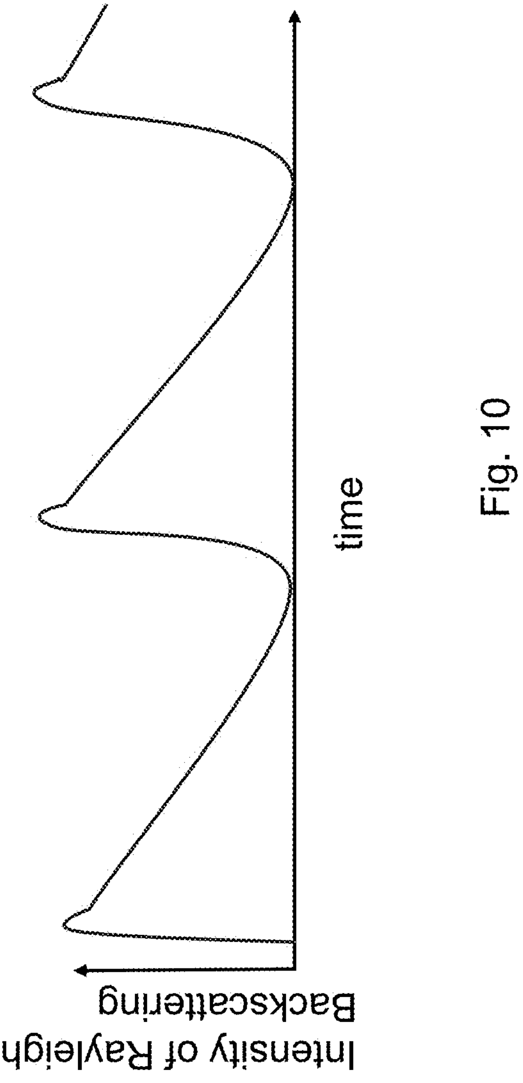
FIG. 10. Schematic of Rayleigh Scattering intensity at each of the loops response to the input pulses of FIG. 9.

The Rayleigh backscattering/reflection signal can be obtained for different spectral windows (e.g., 1528-1563 nm wavelength telecom signals of the C-band). However, FIG. 10 shows how the intensity of Rayleigh backscattering of a signal comprising frequency comb is characterized by exponential decay with increasing propagation distance through each span.

Figure 11:
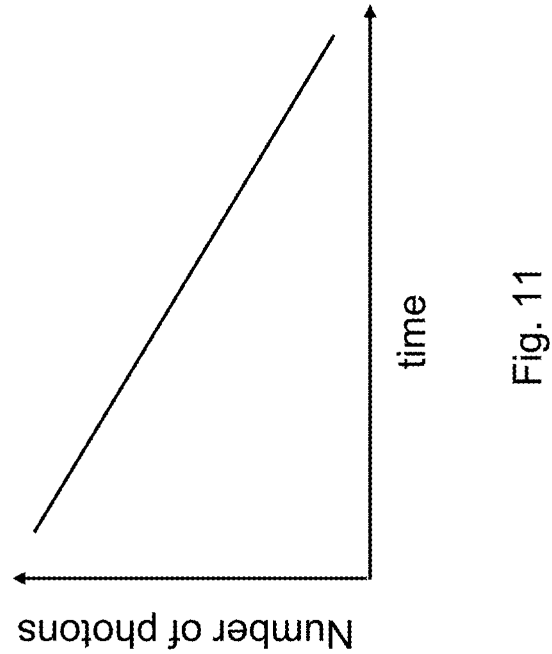
FIG. 11. Schematic of number of photons measured at the detector in response the Rayleigh scattering at each of the fiber loops.

Since the Rayleigh backscattering signal has a frequency spectrum similar to that of the frequency comb spectrum launched into the fiber, the exponential decay of the signal can be used to determine phase changes of optical signal at different positions along each of the i spans. FIG. 11 shows how the log of number of photons from the Rayleigh backscattering will decay as a function of the span length in accordance with the exponential decay illustrated in FIG. 10.

Signal to noise will limit spatial resolution along the submarine cable. Thus, time slices of the data, corresponding to a given spatial resolution (e.g., 100 m, 1 km, 10 km) should be selected based on the signal to noise (e.g., assuming $10^8$ photons originated from Rayleigh backscattering from the ith span, the number of photons will decay below the noise threshold at some point along the span). Spatial resolution is determined by time window selection and can be set based on characteristic features of the environmental effect under the study.

The fiber coupler 302 (typically 90/10 coupler or 98/2 coupler) located in the submarine repeater is a standard component of every submarine repeater and is used for off-service cable cut localization through Rayleigh backscattering. The fiber coupler 302 located in the submarine repeater enables an optical loop where the Rayleigh backscattering signal is received by the coherent detector. The intensity of the received signal depends on the value of fiber coupler (typically 10 . . . 2% of Rayleigh backscattering coupled back by each of two couplers resulting in considerable loss of 20 . . . 35 dB). Coupling loss, for example 35 dB is fixed during repeater manufacturing and cannot be changed during operation. This high loss limits signal to noise ratio of Rayleigh backscattering. Spatial resolution for every cable has to be selected individually based on the value of coupling loss but also based on the properties of the environmental signal of interest. Tsunami wave detection requires spatial resolution comparable with the wavelength of the tsunami, which is 10 . . . 500 km. Time slices of 100 microsecond correspond to 20 km roundtrip time of light in glass.

Since the total number of photons of Rayleigh signal from fiber span is fixed, the best possible signal to noise ratio is achieved with per span spatial resolution. If signal to noise ratio is considerably high, span can be divided in 2, 4, 8, 16, and more sections by selection of shorter time windows.

Phase changes due to tsunami waves are measured based on the comparison to two consecutive measurements of phase. Repetitive nature of signal acquisition defines the characteristic time of environmental effects that can be measured. Because of the long cable duration, one can't send the next pulse before the previous signal is returned, which sets a high limit to the frequency of environmental signals. For example, a 1,000 km cable can be interrogated with 100 Hz repetition rate; a 200 km cable can be interrogated with 0.5 kHz perception rate etc. (i.e., Particular cable length dictates the spatial and frequency response that can be used). That high limit does not affect tsunami monitoring capability as tsunami characteristic frequency is in milli-Hertz range. Two timescales can be adjusted—slow and fast: slow is determined by pulse repetition rate; and fast is limited by pulsewidth.

Example Warning System

Figure 12:
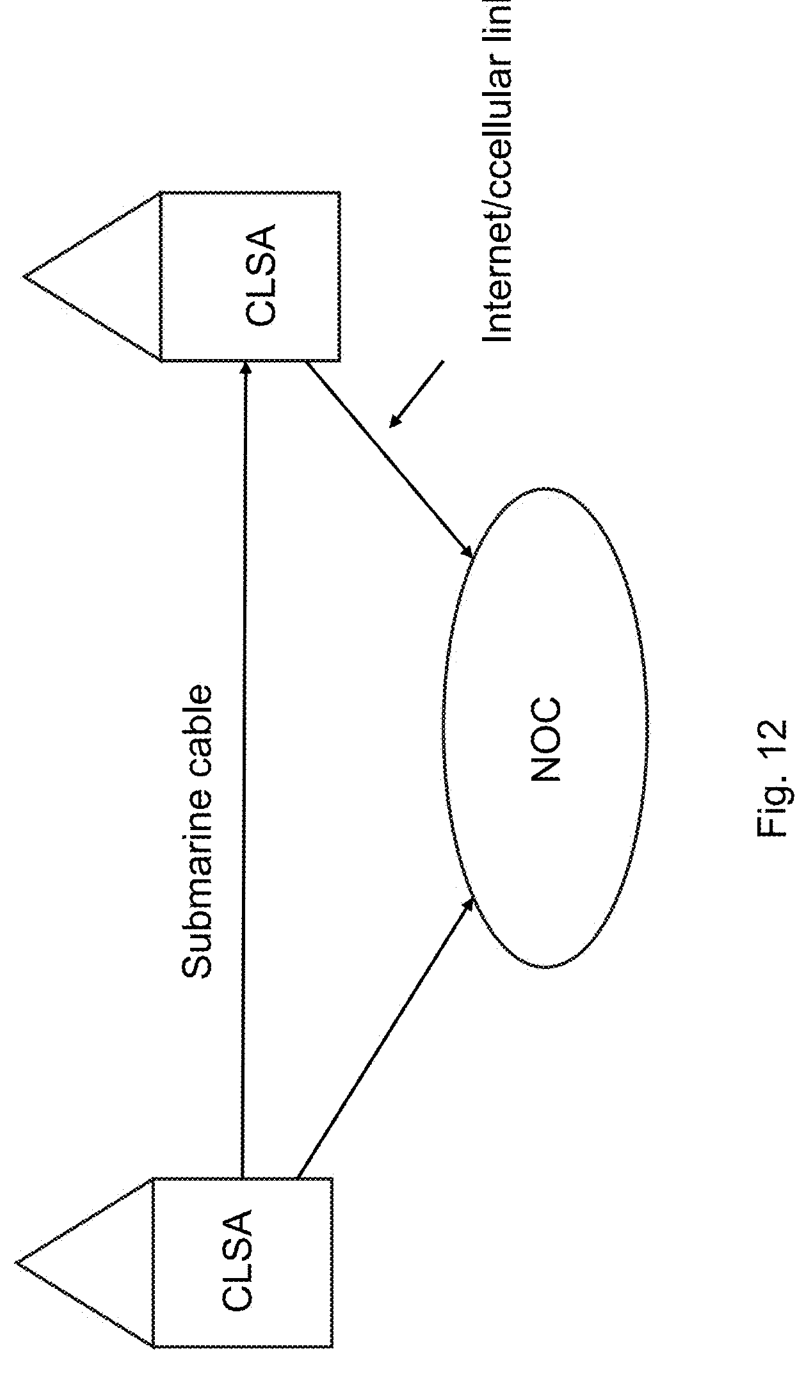
FIG. 12. Schematic of a system of cable landing stations coupled to a network operation center using an internet or cellular connection.
Figure 13:
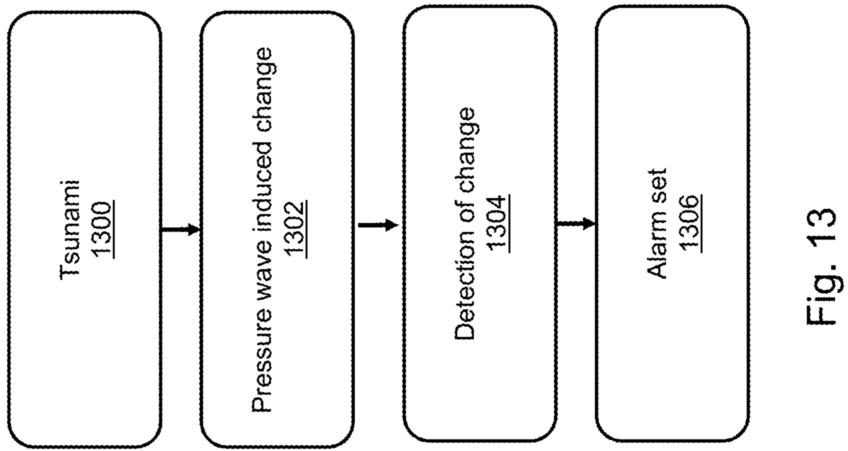
FIG. 13. Flowchart illustrating a method of warning the presence of a tsunami.

FIG. 12 shows a system comprising connection of Cable Landing Station A and B (CLSA and CLSB) to a network operation center (NOC). The NOC can implement the detection method illustrated in FIG. 13 and comprise a computer executing an algorithm for the detecting changes in a property of the fibers as described herein. A computer algorithm can further set thresholds above which an alarm signal is sent to warn the presence of a tsunami.

Advantages and Improvements

A system according to embodiments described herein enables detection of tsunamis in the open ocean submarine cables and utilizing existing global telecom infrastructure. Incorporating microwave modulation, HLLB, and Rayleigh backscattering allows for enhanced accuracy and stability and is expected to out performs DART buoys in scalability and real-time data analysis.

In some embodiments, simultaneous earthquake and tsunami wave detection enables low false positive tsunami warning algorithms, where distributed strain sensors use operational submarine optical communication cable with tsunami induced Poisson effect changes in fiber detected with frequency comb interrogated Rayleigh scattering and various optical spectroscopic techniques.

Hardware Environment

Figure 14:
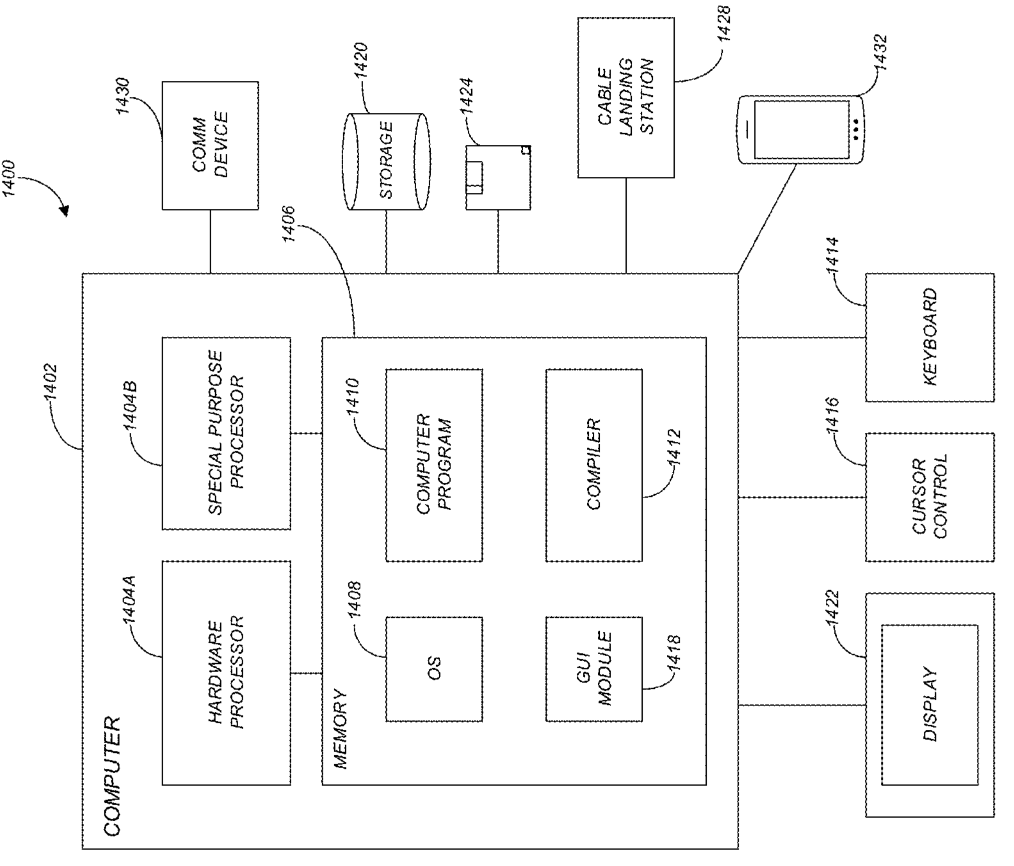
FIG. 14. Hardware environment

FIG. 14 is an exemplary hardware and software environment 1400 (referred to as a computer-implemented system and/or computer-implemented method) used to implement one or more embodiments of the invention. The hardware and software environment includes a computer 1402 and may include peripherals. Computer 1402 may be a user/client computer, server computer, or may be a database computer. The computer 1402 comprises a hardware processor 1404A and/or a special purpose hardware processor 1404B (hereinafter alternatively collectively referred to as processor 1404) and a memory 1406, such as random access memory (RAM). The computer 1402 may be coupled to, and/or integrated with, other devices, including input/output (I/O) devices such as a keyboard 1414, a cursor control device 1416 (e.g., a mouse, a pointing device, pen and tablet, touch screen, multi-touch device, etc.) and a printer 1428. In one or more embodiments, computer 1402 may be coupled to, or may comprise, a portable or media viewing/listening device 1432 (e.g., an MP3 player, IPOD, NOOK, portable digital video player, cellular device, personal digital assistant, etc.). In yet another embodiment, the computer 1402 may comprise a multi-touch device, mobile phone, gaming system, internet enabled television, television set top box, or other internet enabled device executing on various platforms and operating systems.

In one embodiment, the computer 1402 operates by the hardware processor 1404A performing instructions defined by the computer program 1410 (e.g., tsunami warning application) under control of an operating system 1408. The computer program 1410 and/or the operating system 1408 may be stored in the memory 1406 and may interface with the user and/or other devices to accept input and commands and, based on such input and commands and the instructions defined by the computer program 1410 and operating system 1408, to provide output and results.

Output/results may be presented on the display 1422 or provided to another device for presentation or further processing or action. In one embodiment, the display 1422 comprises a liquid crystal display (LCD) having a plurality of separately addressable liquid crystals. Alternatively, the display 1422 may comprise a light emitting diode (LED) display having clusters of red, green and blue diodes driven together to form full-color pixels. Each liquid crystal or pixel of the display 1422 changes to an opaque or translucent state to form a part of the image on the display in response to the data or information generated by the processor 1404 from the application of the instructions of the computer program 1410 and/or operating system 1408 to the input and commands. The image may be provided through a graphical user interface (GUI) module 1418. Although the GUI module 1418 is depicted as a separate module, the instructions performing the GUI functions can be resident or distributed in the operating system 1408, the computer program 1410, or implemented with special purpose memory and processors.

In one or more embodiments, the display 1422 is integrated with/into the computer 1402 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1402 according to the computer program 1410 instructions may be implemented in a special purpose processor 1404B. In this embodiment, some or all of the computer program 1410 instructions may be implemented via firmware instructions stored in a read only memory (ROM), a programmable read only memory (PROM) or flash memory within the special purpose processor 1404B or in memory 1406. The special purpose processor 1404B may also be hardwired through circuit design to perform some or all of the operations to implement the present invention. Further, the special purpose processor 1404B may be a hybrid processor, which includes dedicated circuitry for performing a subset of functions, and other circuits for performing more general functions such as responding to computer program 1410 instructions. In one embodiment, the special purpose processor 1404B or computer 1400 is an application specific integrated circuit (ASIC), field programmable gate array (FPGA), graphics processing unit (GPU), or processor configured for machine learning, artificial intelligence, or neural network implementation.

The computer 1402 may also implement a compiler 1412 that allows an application or computer program 1410 written in a programming language such as C, C++, Assembly, SQL, PYTHON, PROLOG, MATLAB, RUBY, RAILS, HASKELL, or other language to be translated into processor 1404 readable code. Alternatively, the compiler 1412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1410 accesses and manipulates data accepted from I/O devices and stored in the memory 1406 of the computer 1402 using the relationships and logic that were generated using the compiler 1412.

The computer 1402 also optionally comprises an external communication device such as a modem, satellite link, Ethernet card, or other device for accepting input from, and providing output to, other computers 1402.

In one embodiment, instructions implementing the operating system 1408, the computer program 1410, and the compiler 1412 are tangibly embodied in a non-transitory computer-readable medium, e.g., data storage device 1420, which could include one or more fixed or removable data storage devices, such as a zip drive, floppy disc drive 1424, hard drive, CD-ROM drive, tape drive, etc. Further, the operating system 1408 and the computer program 1410 are comprised of computer program 1410 instructions which, when accessed, read and executed by the computer 1402, cause the computer 1402 to perform the steps necessary to implement and/or use the present invention or to load the program of instructions into a memory 1406, thus creating a special purpose data structure causing the computer 1402 to operate as a specially programmed computer executing the method steps described herein. Computer program 1410 and/or operating instructions may also be tangibly embodied in memory 1406 and/or data communications devices 1430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1402.

Figure 15:
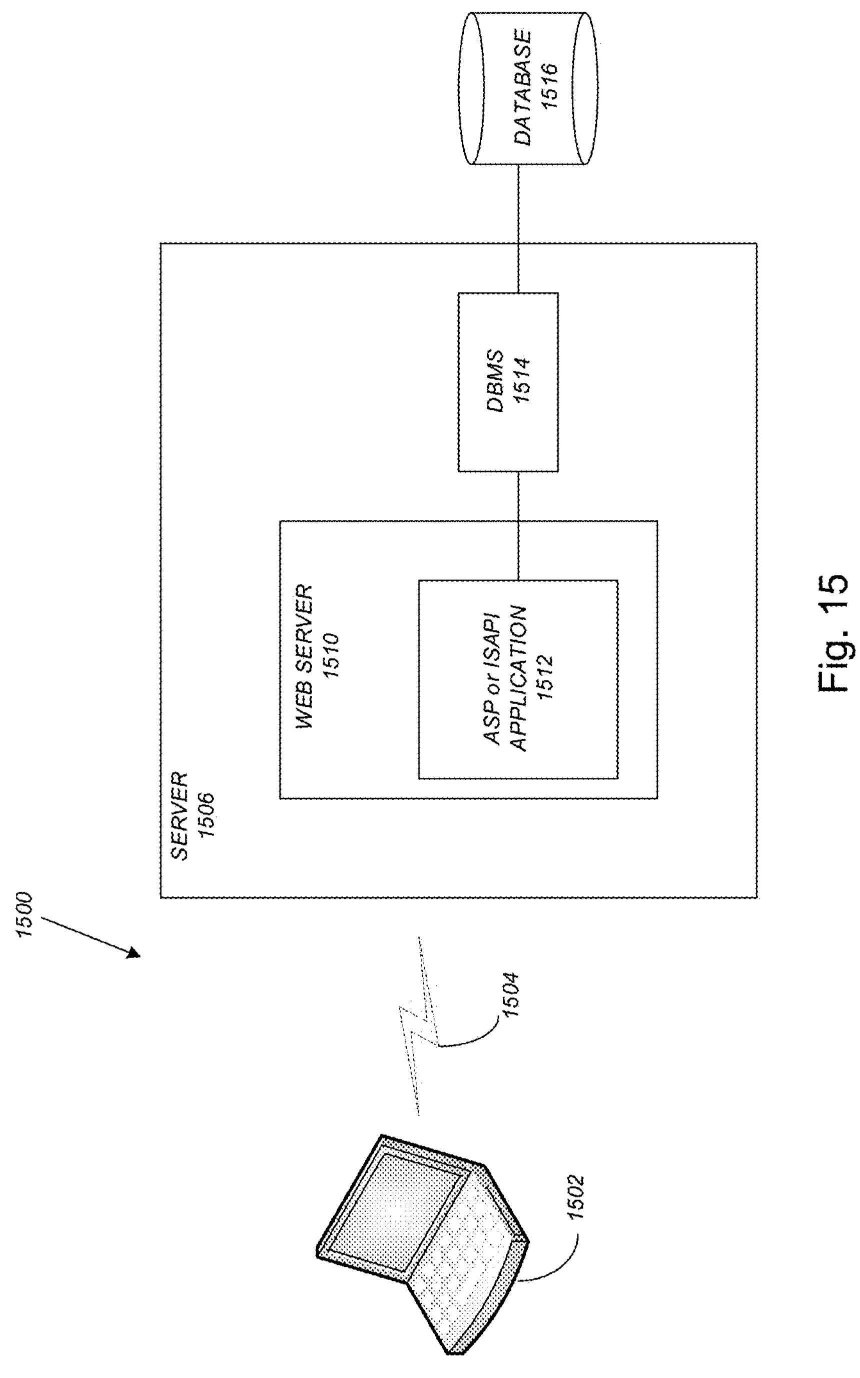
FIG. 15. Network environment.

FIG. 15 schematically illustrates a typical distributed/cloud-based computer system 1500 using a network 1504 to connect client computers 1502 to server computers 1506. A typical combination of resources may include a network 1504 comprising the Internet, LANs (local area networks), WANs (wide area networks), SNA (systems network architecture) networks, or the like, clients 1502 that are personal computers or workstations (as set forth in FIG. 14), and servers 1506 that are personal computers, workstations, minicomputers, or mainframes (as set forth in FIG. 14). However, it may be noted that different networks such as a cellular network (e.g., GSM [global system for mobile communications] or otherwise), a satellite based network, or any other type of network may be used to connect clients 1502 and servers 1506 in accordance with embodiments of the invention.

A network 1504 such as the Internet connects clients 1502 to server computers 1506. Network 1504 may utilize ethernet, coaxial cable, wireless communications, radio frequency (RF), etc. to connect and provide the communication between clients 1502 and servers 1506. Further, in a cloud-based computing system, resources (e.g., storage, processors, applications, memory, infrastructure, etc.) in clients 1502 and server computers 1506 may be shared by clients 1502, server computers 1506, and users across one or more networks. Resources may be shared by multiple users and can be dynamically reallocated per demand. In this regard, cloud computing may be referred to as a model for enabling access to a shared pool of configurable computing resources.

Clients 1502 may execute a client application or web browser and communicate with server computers 1506 executing web servers 1510. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1502 may be downloaded from server computer 1506 to client computers 1502 and installed as a plug-in or ACTIVEX control of a web browser. Accordingly, clients 1502 may utilize ACTIVEX components/component object model (COM) or distributed COM (DCOM) components to provide a user interface on a display of client 1502. The web server 1510 is typically a program such as MICROSOFT'S INTERNET INFORMATION SERVER.

Web server 1510 may host an Active Server Page (ASP) or Internet Server Application Programming Interface (ISAPI) application 1512, which may be executing scripts. The scripts invoke objects that execute business logic (referred to as business objects). The business objects then manipulate data in database 1516 through a database management system (DBMS) 1514. Alternatively, database 1516 may be part of, or connected directly to, client 1502 instead of communicating/obtaining the information from database 1516 across network 1504. When a developer encapsulates the business functionality into objects, the system may be referred to as a component object model (COM) system. Accordingly, the scripts executing on web server 1510 (and/or application 1512) invoke COM objects that implement the business logic. Further, server 1506 may utilize MICROSOFT'S TRANSACTION SERVER (MTS) to access required data stored in database 1516 via an interface such as ADO (Active Data Objects), OLE DB (Object Linking and Embedding DataBase), or ODBC (Open DataBase Connectivity).

Generally, these components 1500-1516 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1502 and 1506 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1502 and 1506. Embodiments of the invention are implemented as a software/tsunami warning application on a client 1502 or server computer 1506. Further, as described above, the client 1502 or server computer 1506 may comprise a thin client device or a portable device that has a multi-touch-based display.

Example Embodiments

Illustrative embodiments of the present invention include, but are not limited to, the following (referring also to FIGS. 1-15).

1. A computer implemented method for detecting a tsunami, comprising, in a computer:
  - receiving electromagnetic (e.g., optical) signals transmitted through a plurality of locations along a submarine telecommunication cable comprising optical fibers;
  - determining, from a property of the optical signals at the different locations, changes in at least one property of the optical fibers spanning the different locations; and
  - associating threshold changes in the at least one property of the optical fibers with detection of a tsunami wave above the locations in the telecommunication cable.

2. The method of clause 1, further comprising the computer outputting an alarm signal when the computer associates the threshold changes with the detection of the tsunami wave.

3. The method of clause 1 or 2, wherein the at least one property of the optical fibers is a length of a span of the optical fibers between each of the locations.

4. The method of any of the clauses 1-3, wherein the optical signals comprise frequency modulated telecom signals (e.g., microwave or RF modulated) and the property of the optical signals comprises a phase of the frequency modulated telecom signal at each of the locations.

5. The method of clause 4, wherein the phase is obtained by demodulation of the frequency modulated telecom signals.

6. The method of any of the clauses 1-5, wherein each of the locations are in a different repeaters for amplifying telecommunication signals transmitted by the telecommunication cable.

7. The method of any of the clauses 1-6, further comprising the computer controlling:

transmission, from a transmitter, of the optical signals comprising frequency modulated telecom signals along a first one of the optical fibers in the cable, wherein each of the repeaters comprises a fiber loop comprising a wavelength filter to a second one of the optical fibers, wherein the wavelength filter passes the frequency modulated telecom signals;

reception, at a receiver, of the frequency modulated signals transmitted through each of the loops at the repeaters and back through the second one of the optical fibers; and wherein the receiver and the transmitter are located at the same cable landing station.

8. The method of any of the clauses 1-7, wherein the repeaters comprise couplers coupling the optical signals into and out of the loops using a high loss loop back system.

9. The method of any of the clauses 1-8, wherein the optical signals comprise a frequency comb and the property of the optical signals comprises a phase of the signal at each of the locations.

10. The method of any of the clauses 1-9, wherein the computer determines the phase of the signal comprising Rayleigh backscattering of the optical signals at each of the locations.

11. The method of any of the clauses 1-10, wherein the transmitter outputs a train or sequence or plurality of n pulses ($2<j\leq n$ where n is an integer) of electromagnetic radiation comprising the electromagnetic signals (input pulses inputted to the fiber in the cable), wherein the repetition rate of the pulses is such that the receiver receives a return (e.g., backscattering or transmission) of the jth one of the pulses (return or transmitted or output pulse) from a given one of the locations (e.g. at the repeaters) before a next one e.g., {j+1)th pulse is transmitted/output from the transmitter into the cable (i.e., the repetition rate depends on the length of the submarine telecommunication cable). In one embodiment, the time separation of the pulses is 100 microseconds, or at least 100 microseconds, and the frequency of the tsunami waves (e.g., 100 millihertz) is less than the repetition rate/frequency at which the pulses are transmitted from the transmitter.

12. The method of any of the clauses 1-10, further comprising the computer comparing the phase between successive ones of the return/transmitted/output pulses from each of the locations, to obtain phase differences between the return/transmitted/output pulses from each of the locations, and associating the phase differences greater than a predetermined threshold as being associated with a detection of a tsunami wave.

13. The method of clause 12 wherein the phase of each of the pulses is determined by mixing the return/output/transmitted pulses with a local oscillator signal, e.g., in a demodulator or demodulator circuit in the receiver e.g., comprising a coherent receiver.

14. The method of clause 13, wherein the demodulator circuit comprises a mixer and a filter (e.g., low pass filter) or an integrator.

15. The method of any of the clauses 11-14, wherein the transmitter comprises a LO oscillator source outputting a frequency comb, the pulses inputted into the fiber comprise the frequency comb, and the return/transmitted/output pulses comprise Rayleigh Backscattering from each of the locations.

16. The method of any of the clauses 11-16, wherein the return/transmitted/output pulses comprise Rayleigh Backscattering of the (e.g., input) pulses from each of the locations.

17. The method of any of the clauses 15-16 wherein the mixing between the local oscillator signal and each of the Rayleigh backscattered pulses outputs the phase comprising an accumulation or addition of the phase changes between each of the lines of the frequency comb of the Rayleigh backscattering and the lines of the frequency comb of the LO oscillator, e.g. so as to increase signal to noise.

18. The method of any of the clauses 10 or 15-17, wherein the length of each of the pulses is selected as a trade off of spatial resolution (shorter pulses provide higher spatial resolution e.g. $c\Delta t$ where c is speed of light in the cable and $\Delta t$ is the pulse length) and signal to noise (longer pulses provide higher signal to noise}. In one embodiment, each of the pulses are at least 10 ns long.

19. The method of any of the clauses, wherein the transmitter comprises a laser or light emitting device 20. A system 200, 700 for detecting a tsunami, comprising:

a computer 1400, 210 implementing an algorithm at a tsunami warning center, the algorithm:

receiving, from a receiver Rx, electromagnetic (e.g., optical) signals transmitted from a transmitter Tx through a plurality of locations 209 along a submarine telecommunication cable 204 comprising optical fibers 206;

determining, from a property of the electromagnetic (e.g., optical) signals at the different locations, changes in at least one property of the optical fibers spanning the locations; and associating threshold changes in at least one property of the optical fibers with detection of a tsunami wave.

21. The system of clause 20, further comprising:

one or more cable landing stations CLSA, CLSB each comprising the transmitter and the receiver;

the submarine telecommunication cable; and a plurality of repeaters 208 positioned at the locations for amplifying telecommunication signals at each of the locations along the cable.

22. The system of clause 20 or 21, wherein:

the transmitter Tx comprises a modulator (e.g., circuit comprising mixing circuit) for modulating a carrier wave with telecom signals to form the signals comprising frequency modulated telecom signals and the property of the electromagnetic signals comprises a phase of the frequency modulated telecom signals at each of the locations; and the receiver Rx comprises a demodulator (e.g., comprising circuit comprising a mixing circuit) for extracting a phase of the electromagnetic signals at each of the locations.

23. The system of any of the clauses 20-22, wherein each of the repeaters comprises:

a first amplifier EDFA coupled to a first one of the optical fibers 206*a* in the cable;

a first coupler 302*a* for coupling at least a portion of the optical signals into a fiber loop 303, comprising a wavelength filter λ, to a second one of the optical fibers 206*b*, wherein the wavelength filter transmits the electromagnetic signals (and may block any signals not being used to determine the changes in the property of the fibers, e.g., in response to the tsunami);

a second coupler 302*b* for coupling the electromagnetic signals from the fiber loop 303 into a second one of the optical fibers 206*b* coupled to a second amplifier EDFA and returning to the receiver Rx; and wherein the computer 1400 controls transmission of the electromagnetic signals from the transmitter to the receiver through the fiber loops 303 to monitor changes in the at least one property of the optical fibers as a function of time.

24. The system of any of the clauses 20-23, wherein:

the repeaters comprise the first coupler, the second coupler, the amplifiers, and the wavelength filter arranged in a high loss loop back system 310; and the electromagnetic signals are transmitted from the transmitter to the receiver through the high loss loop back system.

25. The system of any of the clauses 20-24, wherein the at least one property of the optical fibers is a length of a span 304 of the optical fibers between each of the locations.

26. The system of any of the clauses 20-25, wherein the transmitter comprises a local oscillator LO outputting the optical signals comprising a frequency comb 702 and the property of the optical signals comprises a phase of the signal at each of the locations.

27. The system of clause 26, wherein the computer determines the phase of the signal comprising Rayleigh backscattering of the optical signals at each of the locations.

28. The system of any of clauses 20-27, wherein the computer executes an application outputting an alarm signal when the computer associates the threshold changes with the detection of the tsunami wave and further comprising a communications network coupled to the system of any of the clauses 12-19, wherein the communication network transmits the alarm signal.

29. The method of any of the clauses 1-19 implemented or performed by the system of any of the clauses 12-28.

30. A method of making a system 200, 700 for detecting a tsunami, comprising:

Connecting a transmitter and a receiver to a submarine telecommunication cable;

connecting a computer 1400, 210 implementing an algorithm at a tsunami warning center, the algorithm:

receiving in the receiver Rx, optical signals transmitted from a transmitter Tx through a plurality of locations 209 along a submarine telecommunication cable 204 comprising optical fibers 206;

determining, from a property of the electromagnetic (e.g., optical) signals at the different locations, changes in at least one property of the optical fibers spanning the locations; and associating threshold changes in at least one property of the optical fibers with detection of a tsunami wave.

31. A system 200, 700 for detecting a tsunami, comprising:

a computer 1400, 210 implementing an algorithm at a tsunami warning center, the algorithm:

receiving, from a means for receiving Rx, optical signals transmitted from a means for transmitting Tx through a plurality of locations 209 along a submarine telecommunication cable 204 comprising optical fibers 206;

determining, from a property of the electromagnetic (e.g., optical) signals at the different locations, changes in at least one property of the optical fibers spanning the locations; and associating threshold changes in at least one property of the optical fibers with detection of a tsunami wave.

32. The system or method of clause 30-31 comprising the method or system of any of the embodiments 1-29.

33. The system of any of the clauses 20-32 comprising a computer-implemented system comprising:

(a) the computer having a memory;

(b) a processor executing on the computer;

(c) the memory storing a set of instructions, wherein the set of instructions, when executed by the processor cause the processor to perform operations/the algorithm comprising:

receiving, from the receiver Rx, optical signals transmitted from a transmitter Tx through a plurality of locations 209 along a submarine telecommunication cable 204 comprising optical fibers 206;

determining, from the property of the electromagnetic (e.g., optical) signals at the different locations, changes in at least one property of the optical fibers spanning the locations; and associating the threshold changes in at least one property of the optical fibers with detection of a tsunami wave.

34. The system of clause 33 wherein the changes in the fiber comprise a change in length of the fiber associated with pressure applied from the tsunami wave.

35. The system of any of the clauses 20-33 wherein the computer comprises at least one of a non transitory computer readable medium or an application specific integrated circuit or a field programmable gate array.

36. The system or method of any of the clauses 1-36 wherein the pulses are transmitted and/or the algorithm is implemented 24 hours a day 7 days a week.

37. The system or method of any of the clauses 1-36 wherein the optical signals comprise wavelengths used for telecommunication.

REFERENCES

The following references are incorporated by reference herein

[1] 20 years of developments in optical frequency comb technology and applications by Tara Fortier & Esther Baumann Communications Physics volume 2, Article number: 153 (2019)

[2] Sensitive seismic sensors based on microwave frequency fiber interferometry in commercially deployed cables by Adonis Bogris et. al., *Scientific Reports* volume 12, Article number: 14000 (2022)

[3] Real-Time In-Line Coherent Distributed Sensing over a Legacy Submarine Cable by Mikael Mazur et al. https://opg.optica.org/abstract.cfm?URI=OFC-2024-Th4B.8., Optical Fiber Communication Conference (OFC) 2024, 2024.

[4] Coherently parallel fiber-optic distributed acoustic sensing using dual Kerr soliton microcombs by Juang-Ting Li et al. Science Advances, 2024, https://www.science.org/doi/10.1126/sciadv.adf8666

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for detecting a tsunami, comprising, in a computer:

receiving electromagnetic signals transmitted through a plurality of different locations along a submarine telecommunication cable comprising optical fibers, wherein the electromagnetic signals comprise frequency modulated telecom signals;

determining, from a phase of the electromagnetic signals at the different locations, changes in at least one property of the optical fibers spanning the different locations; and associating threshold changes in the at least one property of the optical fibers with detection of a tsunami wave above the locations in the telecommunication cable.

2. The method of claim 1, further comprising the computer outputting an alarm signal when the computer associates the threshold changes with the detection of the tsunami wave.

3. The method of claim 1, wherein the at least one property of the optical fibers is a length of a span of the optical fibers between each of the locations.

4. The method of claim 1, wherein the phase is obtained by demodulation of the frequency modulated telecom signals.

5. The method of claim 1, wherein each of the locations are in a different repeater for amplifying telecommunication signals transmitted by the telecommunication cable.

6. The method of claim 5, further comprising the computer controlling:

transmission, from a transmitter, of the electromagnetic signals comprising the frequency modulated telecom signals along a first one of the optical fibers in the telecommunication cable, wherein each of the repeaters comprises a fiber loop comprising a wavelength filter to a second one of the optical fibers, wherein the wavelength filter passes the frequency modulated telecom signals;

reception, at a receiver, of the frequency modulated telecom signals transmitted through each of the fiber loops at the repeaters and back through the second one of the optical fibers; and wherein the receiver and the transmitter are located at the same cable landing station.

7. The method of claim 6, wherein the repeaters comprise couplers coupling the electromagnetic signals into and out of the fiber loops using a high loss loop back system.

8. The method of claim 1, wherein the electromagnetic signals comprise a frequency comb and the electromagnetic signals comprise the phase of the signal at each of the different locations.

9. The method of claim 8, wherein the computer determines the phase of the signal comprising Rayleigh backscattering of the electromagnetic signals at each of the locations.

10. A system for detecting a tsunami, comprising:

a computer implementing an algorithm at a tsunami warning center, the algorithm:

receiving, from a receiver, electromagnetic signals transmitted from a transmitter through a plurality of locations along a submarine telecommunication cable comprising optical fibers, wherein the electromagnetic signals comprise frequency modulated telecom signals;

determining, from a phase of the electromagnetic signals at the different locations, changes in at least one property of the optical fibers spanning the locations; and associating threshold changes in at least one property of the optical fibers with detection of a tsunami wave.

11. The system of claim 10, further comprising:

one or more cable landing stations each comprising the transmitter and the receiver;

the telecommunication cable; and a plurality of repeaters positioned at the locations for amplifying telecommunication signals at each of the locations along the telecommunication cable.

12. The system of claim 11, wherein:

the transmitter comprises a modulator for modulating telecom signals to form the electromagnetic signals comprising the frequency modulated telecom signals and the electromagnetic signals comprise the phase of the frequency modulated telecom signals at each of the different locations; and the receiver comprises a demodulator for extracting the phase of the electromagnetic signals at each of the different locations.

13. The system of claim 12, wherein each of the repeaters comprises:

a first amplifier coupled to a first one of the optical fibers in the telecommunication cable;

a first coupler for coupling at least a portion of the electromagnetic signals into a fiber loop, comprising a wavelength filter, to a second one of the optical fibers, wherein the wavelength filter transmits the electromagnetic signals;

a second coupler for coupling the electromagnetic signals from the fiber loop into a second one of the optical fibers coupled to a second amplifier and returning to the receiver; and wherein the computer controls transmission of the electromagnetic signals from the transmitter to the receiver through the fiber loops to monitor changes in the at least one property of the optical fibers as a function of time.

14. The system of claim 13, wherein:

the repeaters comprise the first coupler, the second coupler, the amplifiers, and the wavelength filter arranged in a high loss loop back system; and the electromagnetic signals are transmitted from the transmitter to the receiver through the high loss loop back system.

15. The system of claim 10, wherein the at least one property of the optical fibers is a length of a span of the optical fibers between each of the locations.

16. The system of claim 11, wherein the transmitter comprises a local oscillator outputting the electromagnetic signals comprise a frequency comb and the electromagnetic signals comprises the phase of the signal at each of the locations.

17. The system of claim 16, wherein the computer determines the phase of the signal comprising Rayleigh backscattering of the electromagnetic signals at each of the locations.

18. The system of claim 10, wherein the computer executes an application outputting an alarm signal when the computer associates the threshold changes with the detection of the tsunami wave and further comprising a communications network coupled to the system of claim 10, wherein the communication network transmits the alarm signal.

* * * * *